(12) United States Patent
Senthil

(10) Patent No.: US 11,449,912 B1
(45) Date of Patent: Sep. 20, 2022

(54) SYSTEM AND METHOD FOR FACILITATING E-COMMERCE TRANSACTION USING AN INTERACTIVE SUPPORT AGENT PLATFORM

(71) Applicant: 1ClickPay Inc, Sammamish, WA (US)

(72) Inventor: Kumar N Senthil, Sammamish, WA (US)

(73) Assignee: 1ClickPay Inc, Sammamish, WA (US)

( * ) Notice: Subject to any disclaimer, the term of this patent is extended or adjusted under 35 U.S.C. 154(b) by 0 days.

(21) Appl. No.: 17/223,085

(22) Filed: Apr. 6, 2021

(51) Int. Cl.
*G06Q 30/00* (2012.01)
*G06Q 30/06* (2012.01)
*G06Q 30/04* (2012.01)

(52) U.S. Cl.
CPC ......... *G06Q 30/0613* (2013.01); *G06Q 30/04* (2013.01); *G06Q 30/0633* (2013.01); *G06Q 30/0603* (2013.01)

(58) Field of Classification Search
CPC .... G06Q 30/00; G06Q 30/06; G06Q 30/0601; G06Q 30/0623; G06Q 30/0625; G06Q 30/0633; G06Q 30/0641
See application file for complete search history.

(56) References Cited

U.S. PATENT DOCUMENTS

| | | | | |
|---|---|---|---|---|
| 6,731,788 B1* | 5/2004 | Agnihotri | ............ | G11B 27/28 382/165 |
| 6,868,392 B1* | 3/2005 | Ogasawara | ............ | G06Q 30/06 705/7.29 |
| 8,458,053 B1* | 6/2013 | Buron | ................ | G06Q 30/0631 705/26.1 |
| 8,660,912 B1* | 2/2014 | Dandekar | ............. | G06Q 30/02 705/26.1 |

(Continued)

FOREIGN PATENT DOCUMENTS

| KR | 20000050097 A | 8/2000 |
|---|---|---|
| KR | 20170090350 A | 8/2017 |

OTHER PUBLICATIONS

Chaves, I., et al. "A secure e-commerce platform to enable the worldwide use of standards." Proceedings of 1er Congreso Iberoamericano de Seguridad Informatica, Morelia Michoacán, Mexico. 2002. (Year: 2002).*

*Primary Examiner* — Christopher B Seibert
(74) *Attorney, Agent, or Firm* — Jason C. Cameron (57) ABSTRACT

A system for facilitating e-commerce transaction is disclosed. The system includes a request receiving module to enable the interactive support agent platform to receive order requests from a customer. The system includes an order placement module to identify a merchant from a merchant database based on the order requests corresponds to the customer specific merchandise or service request and enable the interactive support agent platform to select products from a catalogue of an identified merchant based on the order requests. The system includes a checkout processing module to enable the interactive support agent platform to share a checkout page with the customer via a communication medium based on selected products corresponds to the identified merchant and perform a checkout process by transmitting billing and shipping information via a secure checkout page rendered within a chat window, a browser or the user interface corresponding to the interactive support agent platform.

12 Claims, 5 Drawing Sheets

(56) References Cited

U.S. PATENT DOCUMENTS

| | | | | |
|---|---|---|---|---|
| 8,977,554 B1* | 3/2015 | Hertschuh | | G06Q 30/0623 704/270 |
| 9,224,167 B2* | 12/2015 | Lampert | | G06Q 30/0633 |
| 9,613,160 B2* | 4/2017 | Houle | | G06F 40/143 |
| 2002/0174018 A1* | 11/2002 | Bunger | | G06Q 30/0224 705/26.8 |
| 2006/0224973 A1* | 10/2006 | Albrecht | | G06F 9/451 715/760 |
| 2007/0050406 A1* | 3/2007 | Byers | | G06F 16/48 |
| 2007/0106570 A1* | 5/2007 | Hartman | | G06Q 20/12 705/26.8 |
| 2007/0112647 A1* | 5/2007 | Borders | | G06Q 30/016 705/26.81 |
| 2007/0233579 A1* | 10/2007 | Saarinen | | G06Q 30/0633 705/26.8 |
| 2007/0294240 A1* | 12/2007 | Steele | | G06F 16/951 707/999.005 |
| 2008/0244721 A1* | 10/2008 | Barrus | | H04L 9/0819 726/9 |
| 2009/0037291 A1* | 2/2009 | Dawson | | G06Q 30/0603 705/27.2 |
| 2009/0132347 A1* | 5/2009 | Anderson | | G06Q 30/02 705/30 |
| 2009/0157479 A1* | 6/2009 | Caldwell | | G06Q 30/0631 705/26.7 |
| 2009/0292778 A1* | 11/2009 | Makar | | G06F 16/00 345/619 |
| 2010/0114654 A1* | 5/2010 | Lukose | | G06Q 30/0256 705/14.54 |
| 2011/0106597 A1* | 5/2011 | Ferdman | | G06Q 30/0241 235/375 |
| 2011/0184834 A1* | 7/2011 | Perrochon | | G06Q 30/0633 705/26.8 |
| 2012/0136756 A1* | 5/2012 | Jitkoff | | G06F 16/9577 715/224 |
| 2012/0191569 A1* | 7/2012 | Shah | | G06Q 30/0613 705/26.41 |
| 2012/0221437 A1* | 8/2012 | Yoo | | G06Q 20/209 705/26.41 |
| 2012/0233020 A1* | 9/2012 | Eberstadt | | G06Q 30/06 705/26.1 |
| 2012/0310738 A1* | 12/2012 | Mesaros | | G06Q 50/01 705/14.57 |
| 2013/0013427 A1* | 1/2013 | Gonsalves | | G06Q 30/02 705/27.1 |
| 2013/0066987 A1* | 3/2013 | Levinson | | G06Q 10/10 709/206 |
| 2013/0066988 A1* | 3/2013 | Levinson | | G06Q 10/107 709/206 |
| 2013/0076788 A1* | 3/2013 | Ben Zvi | | G06F 16/51 345/633 |
| 2013/0290149 A1* | 10/2013 | Rashwan | | G06Q 30/0641 705/27.1 |
| 2013/0325980 A1* | 12/2013 | Ohayon | | H04L 51/066 709/206 |
| 2013/0339229 A1* | 12/2013 | Li | | H04L 12/1453 705/40 |
| 2014/0019367 A1* | 1/2014 | Khan | | G06Q 20/425 705/16 |
| 2014/0052617 A1* | 2/2014 | Chawla | | G06Q 20/102 705/39 |
| 2014/0095583 A1* | 4/2014 | Houle | | G06F 40/197 709/203 |
| 2014/0136334 A1* | 5/2014 | Lagassey | | G06Q 30/0277 705/14.69 |
| 2014/0136990 A1* | 5/2014 | Gonnen | | H04L 51/18 715/752 |
| 2014/0229339 A1* | 8/2014 | Massiere | | G06Q 20/40 705/26.81 |
| 2014/0279266 A1* | 9/2014 | Lampert | | G06Q 30/0629 705/26.64 |
| 2014/0297362 A1* | 10/2014 | Kumar | | G06Q 30/0253 705/7.29 |
| 2014/0297537 A1* | 10/2014 | Kassemi | | G06Q 20/02 705/67 |
| 2015/0052061 A1* | 2/2015 | Anderson | | G06Q 20/409 705/44 |
| 2015/0088655 A1* | 3/2015 | Taylor | | G06Q 30/0264 705/14.61 |
| 2015/0088686 A1* | 3/2015 | Glassberg | | G06Q 50/01 705/26.8 |
| 2015/0142640 A1* | 5/2015 | Kneen | | G06Q 20/22 705/39 |
| 2015/0149168 A1* | 5/2015 | Stent | | G10L 15/22 704/235 |
| 2015/0317698 A1* | 11/2015 | Kalyvas | | G06Q 30/0214 705/14.66 |
| 2016/0042420 A1* | 2/2016 | Purcell | | G06Q 30/0613 705/26.41 |
| 2019/0306137 A1* | 10/2019 | Isaacson | | G06Q 20/20 |

* cited by examiner

SYSTEM AND METHOD FOR FACILITATING E-COMMERCE TRANSACTION USING AN INTERACTIVE SUPPORT AGENT PLATFORM

FIELD OF INVENTION

Embodiment of the present disclosure relate to electronic shopping system, and more particularly to, a system and a method for facilitating e-commerce transaction using an interactive support agent platform.

BACKGROUND

Internet shopping capable of providing convenient purchasing abilities from one's home with a simple click of a mouse. On the consumer side, the amount of time spent searching for a website offering a desired merchandise or service is highly dependent on the level of the consumer's experience. To the unwary and the inexperienced customer, internet shopping often proves to be a time-consuming and frustrating experience. Consequently, the consumer may be forced to purchase a less satisfactory merchandise from a site that the search did provide, or not purchase the product at all, to the detriment of both consumers and retailers. Although a certain degree of product or service information may be provided in the sites, such information will not suffice to answer all the questions that a consumer may have. Thus, during internet shopping, a consumer has no access to additional information and suggestions that may come from a salesperson as would normally be the case if the purchase were being done in a conventional retail environment. The lack of interaction between customers and retailers is also a drawback when analyzed from the retailer's point of view. The lack of interaction between customers and retailers also makes it difficult for retailers to understand consumer needs and demands.

Conventional system allows marketing of a small number of support agent and merchant relationships. The process of having each merchant set up a dedicated website for every support agent who wishes to market its product through the support agent may include a time consuming process for the merchant. In addition, the support agents are burdened with having to deal with different and often unknown ways which the different merchants may have chosen to implement their individual websites. Such situation may cause the support agent to maintain separate adapter systems for each merchant, it decides to promote. In some cases, agents end up needing more information from the customer or more time for the developers to take a peek at the problem. Sometimes, they mess up and hand out the wrong answer, which ends up protracting the exchange.

Hence, there is a need for an improved system and method for facilitating e-commerce transaction using an interactive support agent platform to address the aforementioned issue(s).

BRIEF DESCRIPTION

In accordance with an embodiment of the present disclosure, a system for facilitating e-commerce transaction using an interactive support agent platform is provided. The system includes a user interface and an application programming interface configured to enable communication with the one or more e-commerce websites via the interactive support agent platform. The system includes a processing subsystem hosted on a server and configured to execute on a network to control bidirectional communications among a plurality of modules. The processing subsystem includes a request receiving module configured to enable the interactive support agent platform to receive one or more order request from a customer, where the one or more order request corresponds to customer specific merchandise or service request. The processing subsystem also includes an order placement module communicatively coupled to the request receiving module. The order placement module is configured to identify a merchant from a merchant database based on the one or more order request corresponds to the customer specific merchandise or service request. The order placement module is also configured to enable the interactive support agent platform to select one or more products from a catalogue of an identified merchant based on the one or more order request. The processing subsystem further includes a checkout processing module communicatively coupled to the order placement module. The checkout processing module is configured to enable the interactive support agent platform to share a checkout page with the customer via a communication medium based on one or more selected products corresponds to the identified merchant. The checkout processing module is also configured to perform a checkout process by transmitting billing and shipping information via a secure checkout page rendered within at least one of a chat window, a browser or the user interface corresponding to the interactive support agent platform.

In accordance with another embodiment of the present disclosure, a method for facilitating e-commerce transaction using an interactive support agent platform is provided. The method includes enabling, by a user interface and an application programming interface, communication with the one or more e-commerce websites via the interactive support agent platform. The method also includes executing, by a processing subsystem, on a network to control bidirectional communications among a plurality of modules. The method further includes enabling, by a request receiving module, the interactive support agent platform to receive one or more order request from a customer, where the one or more order request corresponds to customer specific merchandise or service request. The method further includes identifying, by an order placement module, a merchant from a merchant database based on the one or more order request corresponds to the customer specific merchandise or service request. The method further includes enabling, by the order placement module, the interactive support agent platform to select one or more products from a catalogue of an identified merchant based on the one or more order request. The method further includes enabling, by a checkout processing module, the interactive support agent platform to share a checkout page with the customer via a communication medium based on one or more selected products corresponds to the identified merchant. The method further includes performing, by the checkout processing module, a checkout process by transmitting billing and shipping information via a secure checkout page rendered within at least one of a chat window, a browser or the user interface corresponding to the interactive support agent platform.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to system and method for facilitating e-commerce transaction using an interactive support agent platform. In general terms, the system establishes a two-way communication between consumers and merchants during electronic shopping, specifically, shopping on the Internet. The communication instituted is similar to the two-way communication relationship between customers and vendors in a conventional retail environment. While in such conventional retail environment a customer interacts with a salesperson, here a customer according to the system interacts with an interactive support agent (ISA) which in turn interacts with the merchants. Further, the system described hereafter in FIG. 1 is for facilitating e-commerce transaction using an interactive support agent platform.

Figure 1:
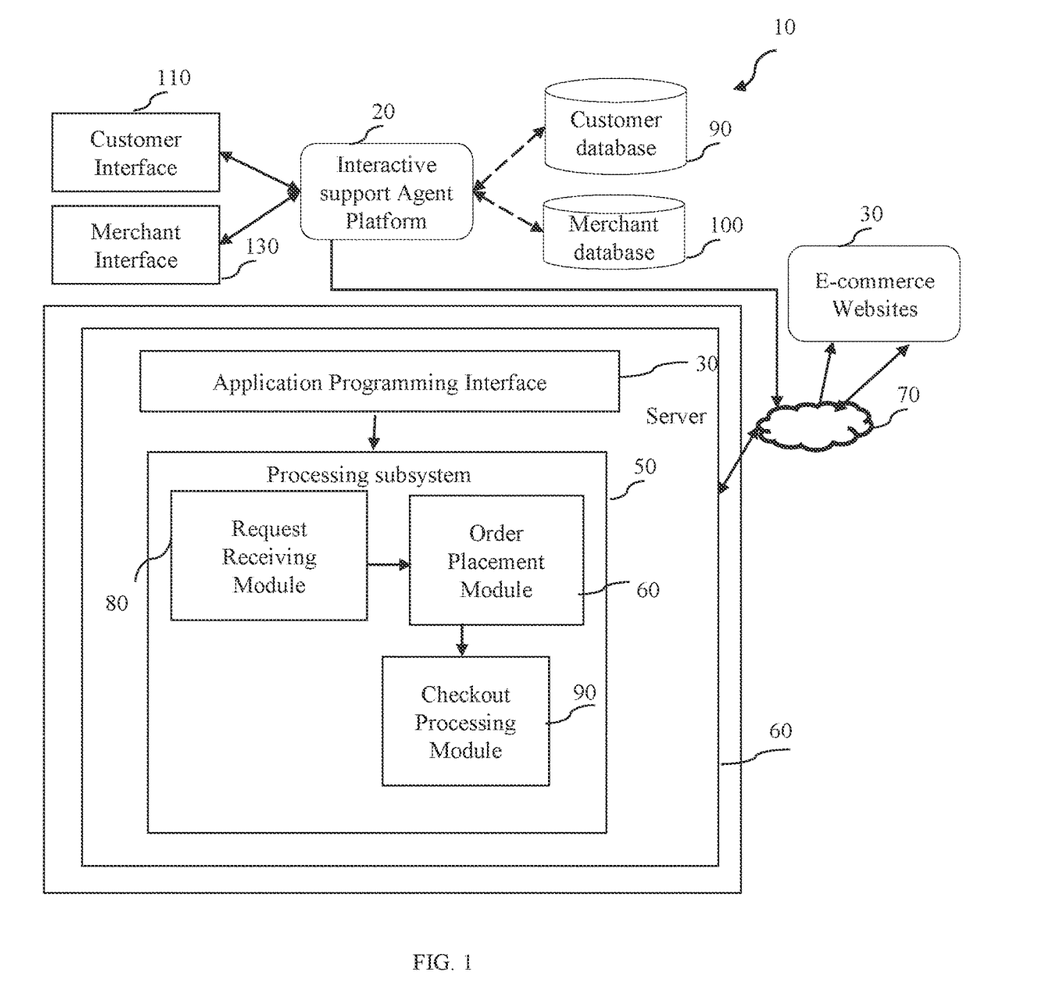
FIG. 1 is a block diagram representation of system for facilitating e-commerce transaction using an interactive support agent platform in accordance with an embodiment of the present disclosure.

FIG. 1 is a block diagram representation of system 10 for facilitating e-commerce transaction using an interactive support agent platform 20 in accordance with an embodiment of the present disclosure. As used herein, an electronic transaction is the sale or purchase of goods or services, whether between businesses, households, individuals, governments, and other public or private organizations, conducted over computer mediated networks. The goods and services are ordered over those networks, but the payment and the ultimate delivery of the good or service may be conducted on or off-line. As used herein, the interactive support agent is a computer generated, animated or artificial intelligence virtual character that serves as an online customer service representative. The interactive support agent leads an intelligent conversation with users, responds to their questions and performs adequate non-verbal behavior. In one embodiment, the interactive support agent platform may support at least one of a chat, a voice, a video, an email a text conversation and the like.

The system 10 includes an application programming interface 30 configured to enable communication with one or more e-commerce websites 40. As used herein, the e-commerce website is a site that sells products and services through means of the data transfer and funds over the internet. As used herein, UI and the application programming interface (API) is a computing interface that defines interactions between multiple software intermediaries. The API defines the kinds of calls or requests which may be made, how to make them, the data formats that should be used, the conventions to follow, or the like. In one embodiment, the API may be remote APIs or web APIs. The remote APIs allow to manipulate remote resources through protocols, specific standards for communication that further allow different technologies to work together, regardless of language or platform. The web APIs are the defined interfaces through which interactions happen between an enterprise and applications that use its assets, which also is a Service Level Agreement (SLA) to specify the functional provider and expose the service path or URL for its API users.

The system 10 also includes a processing subsystem 50 hosted on a server 60. In one embodiment, the server 60 may be a cloud-based server. In another embodiment, parts of the server 60 may be a local server coupled to a user device. The processing subsystem 50 is configured to execute on a network 70 to control bidirectional communications among a plurality of modules. In one embodiment, the network 70 may include one or more terrestrial and/or satellite networks interconnected to communicatively connect the user device to web server engine and a web crawler. In one example, the network 70 may be a private or public local area network (LAN) or Wide Area Network (WAN), such as the Internet. In another embodiment, the network 70 may include both wired and wireless communications according to one or more standards and/or via one or more transport mediums. In one example, the network 70 may include wireless communications according to one of the 802.11 or Bluetooth specification sets, or another standard or proprietary wireless communication protocol. In yet another embodiment, the network 70 may also include communications over a terrestrial cellular network, including, a GSM (global system for mobile communications), CDMA (code division multiple access), and/or EDGE (enhanced data for global evolution) network.

The processing subsystem 50 includes a request receiving module 80 which is configured to enable the interactive support agent platform 20 to receive one or more order request from a customer, where the one or more order request corresponds to customer specific merchandise or service request. In one embodiment, the interactive support agent platform 20 may include a proxy server. As used herein, the word proxy means "to act on behalf of another," and a proxy server acts on behalf of a third party user such as a salesperson in conventional shopping. The proxy server is a computer system or router that functions as a relay between the customer and the merchant. The interactive support agent platform 20 is configured as a network server or a platform computer which hosts a customer database 90 and a merchant database 100. In one embodiment, the database of the interactive support agent platform includes a relation between the merchant database 100 and the customer database 90. In such an embodiment, the merchant database 100 includes product information, product catalogue, price of each product, and description of each product, picture of the corresponding products and the like. In a specific embodiment, the customer database 90 includes customer information, customer requests and the like.

In one embodiment, the interactive support agent platform 20 includes a customer interface 110 for receiving purchase requirements from the customers. In such an embodiment, the customer interface 110 might be a web page, e-mail, or a customer service representative with access to the interactive support agent platform to enable chat, voice, video email and text conversion. If purchase requirements are to be transmitted over the Internet, the customer might log-on to the customer interface 110 where the customer is instructed to provide information as to the name, item requested, and conditions desired. Such conditions may include characteristics sought in the item to be purchased, the price desired, and information as to when and where the customer wants to make the purchase.

The processing subsystem 50 also includes an order placement module 120 communicatively coupled to the request receiving module 80. The order placement module 120 is configured to identify a merchant from the merchant database 100 based on the one or more order request corresponds to the customer specific merchandise or service request. More specifically, the interactive support agent platform 20 via the order placement module 120 identifies appropriate merchant offering the requested goods or services from the merchant database 100. In one embodiment, the merchant database 100 may include an information storage area for maintaining proposal history data for a plurality of matching products or services submitted by the merchant. In such an embodiment, proposal history data might be aptly described as comprising a sequence of lists, with each list including, for example, the name and characteristics of an item requested to the interactive support agent platform by the customer and submitted to the merchant.

Furthermore, the order placement module 120 is also configured to enable the interactive support agent platform 20 to select one or more products from a catalogue of an identified merchant based on the one or more order request. As used herein, the catalogue may be a product catalog which is a type of marketing collateral that lists essential product details that help customer make a purchase decision. The product details may include product features, descriptions, dimensions, price, weight, availability, color, customer reviews, and the like. In one embodiment, the interactive support agent platform is configured to search a product database for additional information on the one or more products and forward the additional information along with information received from the identified merchant about the one or more products to the customer. More specifically, requirements through the order placement module as well as any other additional data in the database allows the selected merchant to propose an item that will better cater to the customer's individual needs and preferences via a merchant interface 130. Rendering such customer-specific proposals not only benefits the customer, but also benefits the merchant because it improves the probability of actual purchase by the customer.

In addition, the processing subsystem 50 further includes a checkout processing module 140 communicatively coupled to the order placement module 120. The checkout processing module 140 is configured to enable the interactive support agent platform 20 to share a checkout page with the customer via a communication medium based on one or more selected products corresponds to the identified merchant. In one embodiment, the communication medium may include a chat window, a browser, a user interface, an email, a text message or the like. The checkout processing module 140 is also configured to perform a checkout process by transmitting billing and shipping information via a secure checkout page rendered within at least one of the chat window, the browser or the user interface corresponding to the interactive support agent platform 20. In one embodiment, the billing and shipping information is mapped with corresponding one or more fields of the secure checkout page based on a semantic and similarity analysis of a natural language mapping technique. The semantic similarity analysis scores words of the one or more fields of the checkout page based on how similar they are, even if they are not exact matches. The semantic and similarity analysis borrows techniques from natural language processing (NLP), such as word embeddings.

Figure 2:
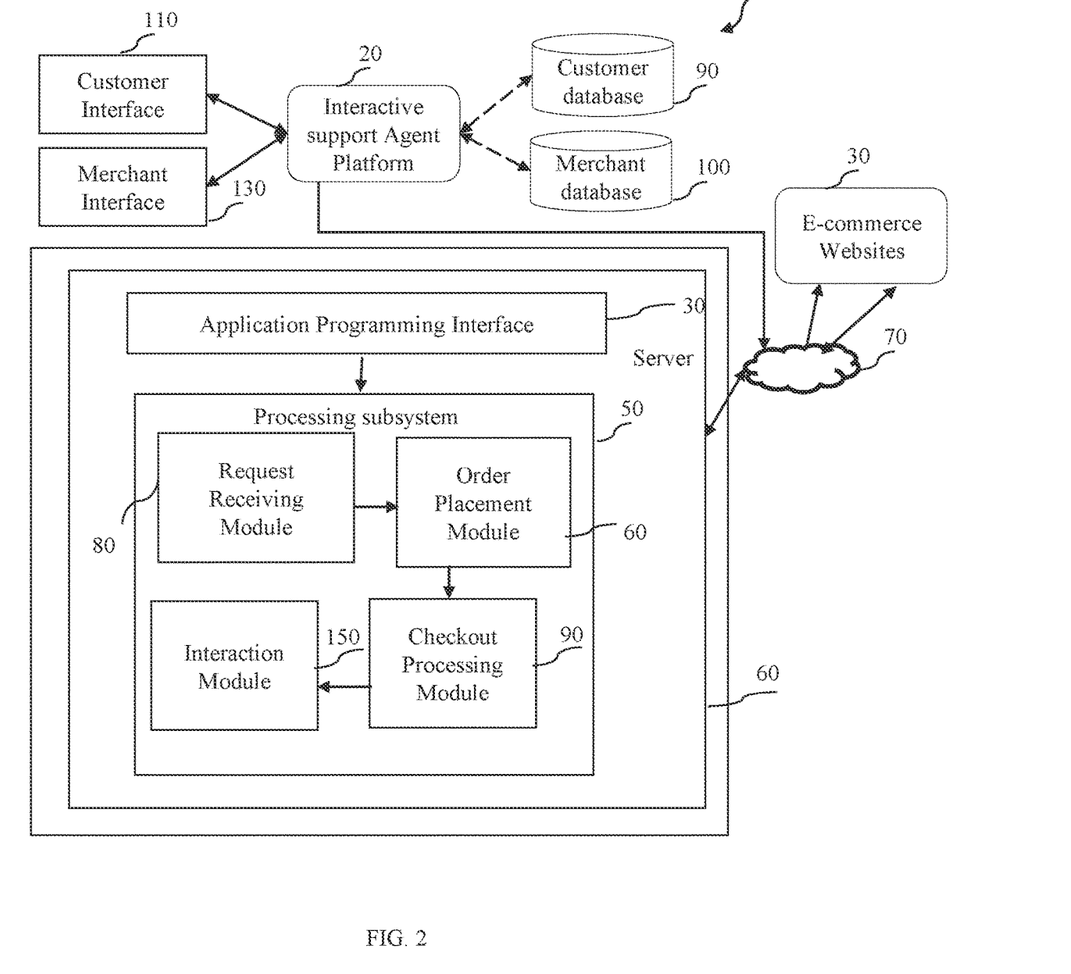
FIG. 2 is a block diagram representation of one embodiment of the system of FIG. 1 in accordance with an embodiment of the present disclosure.

FIG. 2 is a block diagram representation of one embodiment of the system 10 of FIG. 1 in accordance with an embodiment of the present disclosure. The processing subsystem 50 of system of FIG. 1 includes the request receiving module 80, the order placement module 120 and the checkout processing module 140. In one embodiment, the processing subsystem 50 of FIG. 1 includes an interaction module 150 communicatively coupled to the order placement module 120. The interaction module 150 is configured to ask a plurality of questions and provide answers based on communication with the interactive support agent 20 in order to refine selection of the one or more products from the catalog of the merchant. In a specific embodiment, the interaction module 150 allows users to chat or exchange voice via an Internet telephony technology or by way of written formats. In one exemplary embodiment, the questions-answers may be asked via a chat interface. More specifically, the chat interface allowing the customer to exchange chat messages with other users in a chat session over a computer network. The chat interface may be displayed by a local computer and receives input data from the customer of the local computer, such as text characters or speech input. The input data provides an outgoing chat message that may include selection of the one or more products from the catalog of the merchant. The outgoing chat message is sent to a remote computer that is connected to the local host computer via a computer network. The remote computer may display a chat interface and output questions to the customer of the remote computer based information of selection of the one or more products from the catalog of the merchant in the outgoing chat message. An incoming message from the remote computer may also be received at the chat interface, which may also include received selection information from customer. The incoming chat message is displayed on a display device to the customer of the local computer.

Figure 3:
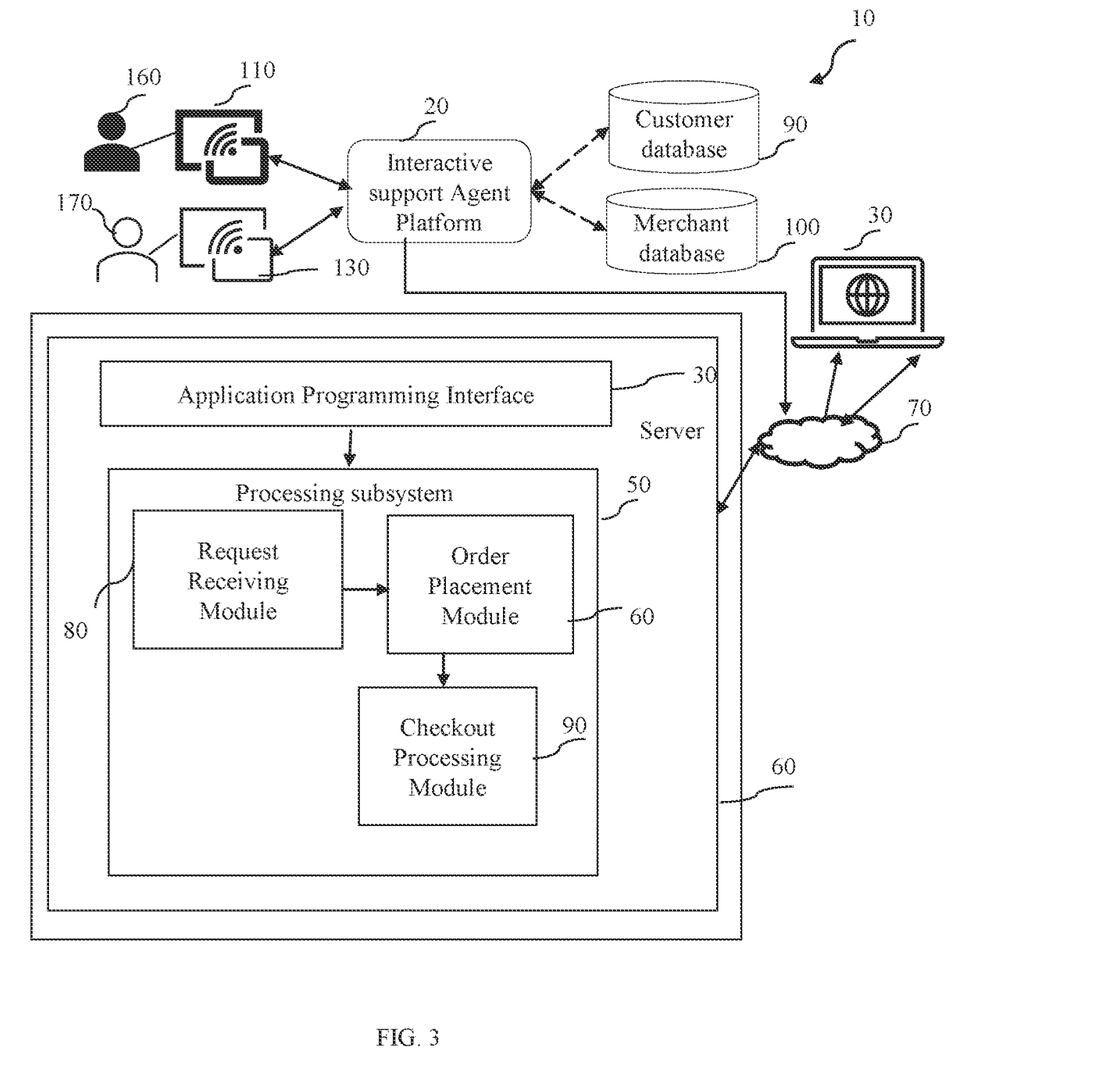
FIG. 3 is a block diagram of an exemplary system of FIG. 1 in accordance with an embodiment of the present disclosure.

FIG. 3 is a block diagram of an exemplary system 10 of FIG. 1 in accordance with an embodiment of the present disclosure. Considering the foregoing description of the features of the system FIG. 1 depicts a non-limiting example. The system 10 includes an interactive support agent (ISA) 20 configured to provide two-way communication between customers 160 and merchants 170. The ISA 20 includes a customer interface 110 for receiving purchase requirements from the customers. The customer interface 110 might include a chat window. The customer 160 accesses the chat window through internet and transmit an order request. The request receiving module 80 enables the interactive support agent 20 to receive the order request from the customer 160. The order request corresponds to customer specific merchandise or service request. Once the order request is received, the customer might redirect to the ESA's web site where the customer is instructed to provide information as to the name, item requested, and conditions desired. Such conditions may include characteristics sought in the item to be purchased, the price desired, and information as to when and where the customer wants to make the purchase.

For instance, the customer desirous of buying men's shoes may provide the following information: "Name: Dale, Item: men's shoes; Price: <$100; Conditions: lightweight, non-slip sole, wide width, no shoelace, brown, size 8: need in one week". Furthermore, the ISA 20 is also suitably configured with an Internet connection and transmits the purchase requirements along with customer profile information to the order placement module 120. Based on the purchase requirement of the customer 160 (men's shoes in the aforementioned example), the order placement module 120 identify a suitable merchant from a merchant database 100 and enable the interactive support agent 20 to select suitable product (out of a wide range of men's shoes under $100) from a catalogue of an identified merchant based on the order request.

Moreover, the merchant 170 is also equipped with network server, platform computers, with an Internet connection to receive requests and profile information from the ISA via merchant interface 130. The order placement module 120 also allows the merchant to submit a recommendation of items and services to the ISA 20 upon reflection of the customer requirements and profile information. The ISA 20 selects one or more products from such recommendations most suitable for the customer based on the interaction with the customer 160.

Subsequently, the customer 160 shares his preference out of the selected products to ISA. As a result, the checkout processing module 140 enables the interactive support agent 20 to share a checkout page with the customer 160 via the chat window or an email for the preferred product. Further, the checkout processing module 140 perform a checkout process by transmitting billing and shipping information via a secure checkout page rendered within the chat window of interactive support agent 20.

Figure 4:
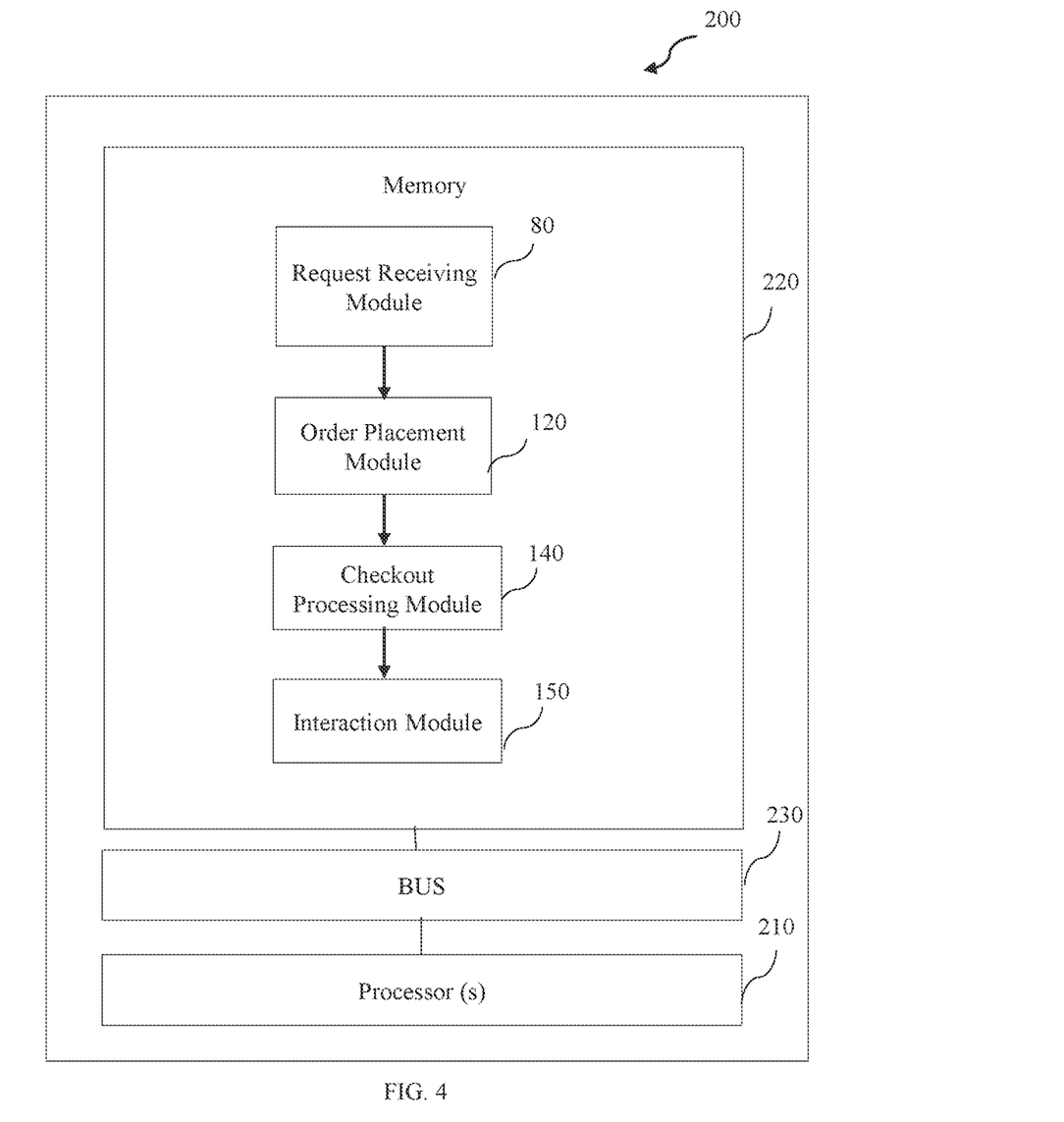
FIG. 4 is a block diagram of a computer or a server for system in accordance with an embodiment of the present disclosure.

FIG. 4 is a block diagram of a computer or a server 200 for system 10 in accordance with an embodiment of the present disclosure. The server includes processor(s) 210, and memory 320 operatively coupled to the bus 230.

The processor(s) 310, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 220 includes a plurality of subsystems and a plurality of modules stored in the form of executable program which instructs the processor 210 to perform the method steps illustrated in FIG. 1. The memory 220 is substantially similar to the system 10 of FIG. 1. The memory 220 has following subsystems: the processing subsystem 50 including the request receiving module 80, the order placement module 120, the checkout processing module 140 and the interaction module 150.

The processing subsystem 50 includes a request receiving module 80 configured to enable the interactive support agent platform 20 to receive one or more order request from a customer, where the one or more order request corresponds to customer specific merchandise or service request. The processing subsystem 50 also includes an order placement module 120 communicatively coupled to the request receiving module 80. The order placement module 120 is configured to identify a merchant from a merchant database based on the one or more order request corresponds to the customer specific merchandise or service request. The order placement module 120 is also configured to enable the interactive support agent platform to select one or more products from a catalogue of an identified merchant based on the one or more order request. The processing subsystem 50 further includes a checkout processing module 140 communicatively coupled to the order placement module 120. The checkout processing module 140 is configured to enable the interactive support agent platform to share a checkout page with the customer via a communication medium based on one or more selected products corresponds to the identified merchant. The checkout processing module 140 is also configured to perform a checkout process by transmitting billing and shipping information via a secure checkout page rendered within at least one of a chat window, a browser or the user interface corresponding to the interactive support agent platform.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 210.

Figure 5:
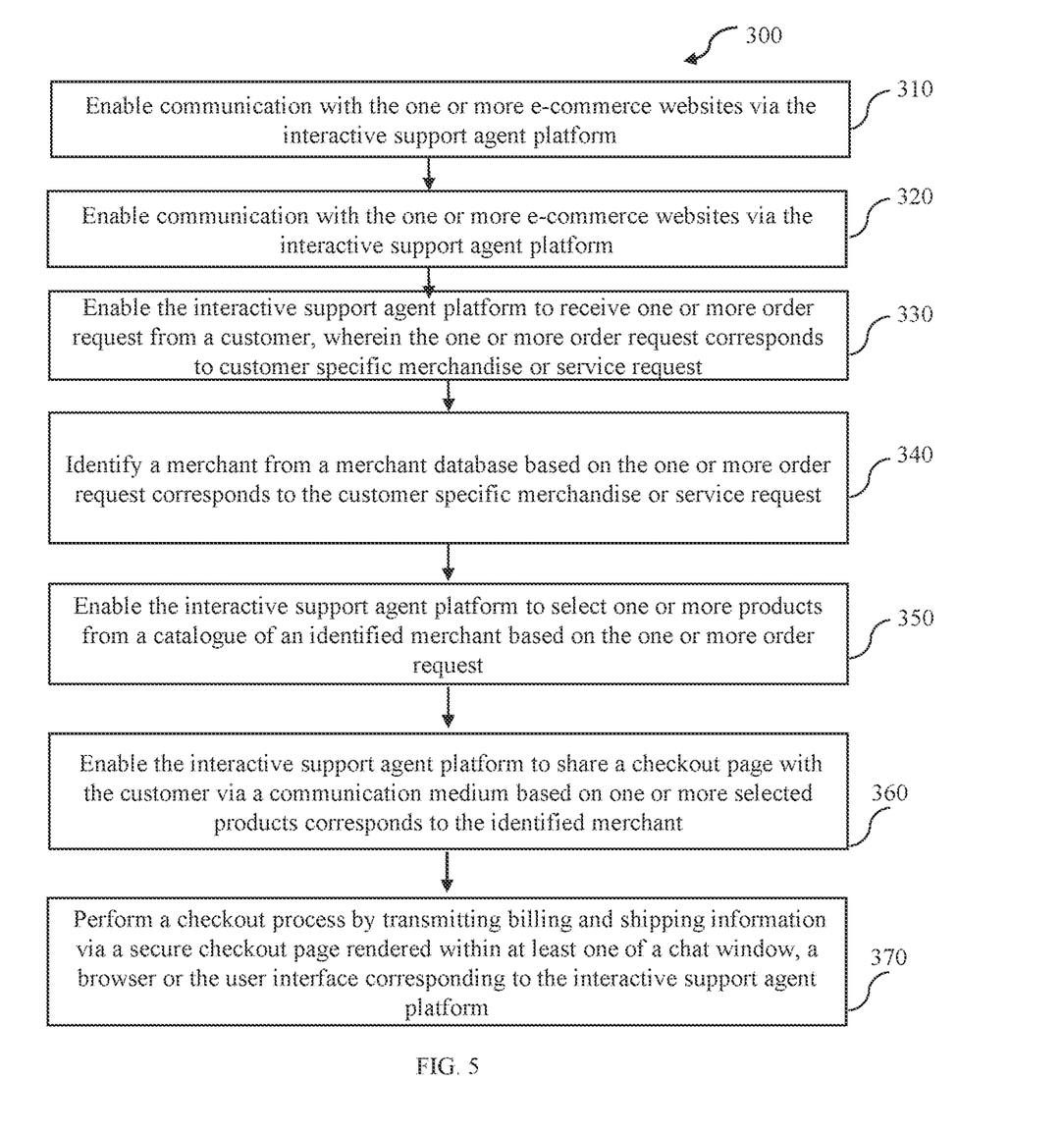
FIG. 5 illustrates a flow chart representing the steps involved in a method for facilitating e-commerce transaction using an interactive support agent platform in accordance with an embodiment of the present disclosure.

FIG. 5 is a flow chart representing the steps involved in a method 300 for facilitating e-commerce transaction using an interactive support agent platform in accordance with an embodiment of the present disclosure. The method 300 includes enabling communication with the one or more e-commerce websites via the interactive support agent platform in step 310. In one embodiment, enabling communication with the one or more e-commerce websites via the interactive support agent platform by a user interface and an application programming interface. The method 300 also includes executing on a network to control bidirectional communications among a plurality of modules in step 320. In one embodiment, executing on a network to control bidirectional communications among a plurality of modules by a processing subsystem. The method 300 further includes enabling the interactive support agent platform to receive one or more order request from a customer, where the one or more order request corresponds to customer specific merchandise or service request in step 330. In one embodiment, enabling the interactive support agent platform to receive one or more order request from a customer by a request receiving module. In one embodiment, the interactive support agent platform may include a proxy server. The interactive support agent platform is configured as a network server or a platform computer which hosts a customer database and a merchant database. In one embodiment, the database of the interactive support agent platform includes a relation between the merchant database and the customer database. In such an embodiment, the merchant database includes product information, product catalogue, price of each product, and description of each product, picture of the corresponding products and the like. In a specific embodiment, the customer database includes customer information, customer requests and the like.

The method 300 further includes identifying a merchant from a merchant database based on the one or more order request corresponds to the customer specific merchandise or service request in step 340. In one embodiment, identifying a merchant from a merchant database based on the one or more order request corresponds to the customer specific merchandise or service request by an order placement module. In a specific embodiment, identifying the merchant from the merchant database comprises providing a database having a relation between the merchant database and a product database associated with the interactive support platform. In some embodiments, identifying the merchant from the merchant database comprises maintaining proposal history data for a plurality of matching products or services submitted by the merchant using an information storage area of the merchant database. In such an embodiment, proposal history data might be aptly described as comprising a sequence of lists, with each list including, for example, the name and characteristics of an item requested to the interactive support agent platform by the customer and submitted to the merchant.

The method 300 further includes enabling the interactive support agent platform to select one or more products from a catalogue of an identified merchant based on the one or more order request in step 350. In one embodiment, enabling the interactive support agent platform to select one or more products from a catalogue of an identified merchant based on the one or more order request by the order placement module. In a specific embodiment, the method includes searching, by the interactive support agent platform, a product database for additional information on the one or more products and forward the additional information along with information received from the identified merchant about the one or more products to the customer.

The method 300 further includes enabling the interactive support agent platform to share a checkout page with the customer via a communication medium based on one or more selected products corresponds to the identified merchant in step 360. In one embodiment, enabling the interactive support agent platform to share a checkout page with the customer via a communication medium based on one or more selected products corresponds to the identified merchant by a checkout processing module. In some embodiments, the communication medium may include a chat window, a browser, a user interface, an email, a text message or the like.

The method 300 further includes performing a checkout process by transmitting billing and shipping information via a secure checkout page rendered within at least one of a chat window, a browser or the user interface corresponding to the interactive support agent platform in step 370. In one embodiment, performing a checkout process by transmitting billing and shipping information via a secure checkout page rendered within at least one of a chat window, a browser or the user interface corresponding to the interactive support agent platform by the checkout processing module. In such an embodiment, performing the checkout process by transmitting billing and shipping information comprises mapping the billing and shipping information with corresponding one or more fields of the secure checkout page based on a sematic and similarity analysis of a natural language mapping technique. The semantic similarity analysis scores words of the one or more fields of the checkout page based on how similar they are, even if they are not exact matches. The semantic and similarity analysis borrows techniques from natural language processing (NLP), such as word embeddings.

In one embodiment, the method 300 may include asking a plurality of questions and provide answers based on communication with the interactive support agent in order to refine selection of the one or more products from the catalog of the merchant. In such an embodiment, asking a plurality of questions and provide answers based on communication with the interactive support agent in order to refine selection of the one or more products from the catalog of the merchant by an interaction module. In a specific embodiment, the interaction module allows users to chat or exchange voice via an Internet telephony technology or by way of written formats. In one exemplary embodiment, the questions-answers may be asked via a chat interface. More specifically, the chat interface allowing the customer to exchange chat messages with other users in a chat session over a computer network.

Various embodiments of the system and method for facilitating e-commerce transaction using an interactive support agent platform as described above enables a significant improvement in the quality and efficiency of electronic shopping. The time-consuming and often unfruitful web searches for appropriate retailers no longer become necessary. Rather, consumers are provided with retailer and merchandise information through interaction with a support agent. The information provided to consumers are further catered to individual needs and preferences. The merchants also benefit from the present system and method because knowledge of individual requests in conjunction with customer profile information allows them to provide appropriate shopping assistance to consumers. This helps bolster sales, Internet or otherwise, and further increases customer satisfaction about items purchased via the Internet.

Furthermore, the consumer's identifying and private information is protected from disclosure as the consumer gathers information about available products. The consumers can identify suitable products more easily, with less expenditure of effort, because the product information is presented in a consistent manner. The consumers can identify suitable products more quickly. The consumers can use advocate recommendations and evaluations in deciding between competing products. Consumers use search engines that have data that is more up-to-date. Consumers access search engines that are easier to use, especially for non-technical users.

Moreover, the system assists consumers in gathering market information quickly and easily and protects consumer identity and private information while gathering market information. The system assists providers in quantifying consumer demand, both offline and in real-time, using historical and current data and assists providers in determining reasons for sales and lost sales. The system assists providers by furnishing a huge base of accurate market data based on actual consumer activity to serve as input to present and future market analysis methods.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for facilitating e-commerce transaction using an interactive support agent platform comprising:
   an application programming interface configured to enable communication with the one or more e-commerce websites via the interactive support agent platform;
   a processing subsystem hosted on a server and configured to execute on a network to control bidirectional communications among a plurality of modules comprising:
      a request receiving module configured to enable the interactive support agent platform to receive one or more order request from a customer, wherein the one or more order request corresponds to customer specific merchandise or service request;
      an order placement module communicatively coupled to the request receiving module, wherein the order placement module is configured to:
         identify a merchant from a merchant database based on the one or more order request corresponds to the customer specific merchandise or service request;
         enable the interactive support agent platform to select one or more products from a catalogue of an identified merchant based on the one or more order request;
      a checkout processing module communicatively coupled to the order placement module, wherein the checkout processing module is configured to:
         enable the interactive support agent platform to share a checkout page with the customer via a communication medium based on one or more selected products corresponds to the identified merchant; and
         perform a checkout process by transmitting billing and shipping information via a secure checkout page rendered within at least one of a chat window, a browser or the user interface corresponding to the interactive support agent platform; wherein the billing and shipping information is mapped with corresponding one or more fields of the secure checkout page based on a semantic and similarity analysis of a natural language mapping technique.

2. The system of claim 1, wherein the interactive support agent platform comprises a proxy server.

3. The system of claim 1, wherein the interactive support agent platform is configured to support at least one of a chat, a voice, a video, an email and a text conversation.

4. The system of claim 1, wherein the interactive support platform comprises a database having a relation between the merchant database and a customer database.

5. The system of claim 1, wherein the merchant database comprises an information storage area for maintaining proposal history data for a plurality of matching products or services submitted by the merchant.

6. The system of claim 1, wherein the interactive support agent platform is configured to search a product database for additional information on the one or more products and forward the additional information along with information received from the identified merchant about the one or more products to the customer.

7. The system as claimed in claim 1, comprising an interaction module communicatively coupled to the order placement module, wherein the interaction module is configured to ask a plurality of questions and provide answers based on communication with the interactive support agent in order to refine selection of the one or more products from the catalog of the merchant.

8. A method comprising:
   enabling, by an application programming interface, communication with the one or more e-commerce websites via the interactive support agent platform;
   executing, by a processing subsystem, on a network to control bidirectional communications among a plurality of modules;
   enabling, by a request receiving module, the interactive support agent platform to receive one or more order request from a customer, wherein the one or more order request corresponds to customer specific merchandise or service request;

identifying, by an order placement module, a merchant from a merchant database based on the one or more order request corresponds to the customer specific merchandise or service request;

enabling, by the order placement module, the interactive support agent platform to select one or more products from a catalogue of an identified merchant based on the one or more order request;

enabling, by a checkout processing module, the interactive support agent platform to share a checkout page with the customer via a communication medium based on one or more selected products corresponds to the identified merchant; and performing, by the checkout processing module, a checkout process by transmitting billing and shipping information via a secure checkout page rendered within at least one of a chat window, a browser or the user interface corresponding to the interactive support agent platform; wherein performing the checkout process by transmitting billing and shipping information comprises mapping the billing and shipping information with corresponding one or more fields of the secure checkout page based on a sematic and similarity analysis of a natural language mapping technique.

9. The method of claim 8, wherein identifying the merchant from the merchant database comprises providing a database having a relation between the merchant database and a product database associated with the interactive support platform.

10. The method of claim 8, wherein identifying the merchant from the merchant database comprises maintaining proposal history data for a plurality of matching products or services submitted by the merchant using an information storage area of the merchant database.

11. The method of claim 8, comprising searching, by the interactive support agent platform, a product database for additional information on the one or more products and forward the additional information along with information received from the identified merchant about the one or more products to the customer.

12. The method of claim 8, comprising asking, by an interaction module, a plurality of questions and provide answers based on communication with the interactive support agent in order to refine selection of the one or more products from the catalog of the merchant.

* * * * *

UNITED STATES PATENT AND TRADEMARK OFFICE
CERTIFICATE OF CORRECTION

| | |
|---|---|
| PATENT NO. | : 11,449,912 B1 |
| APPLICATION NO. | : 17/223085 |
| DATED | : September 20, 2022 |
| INVENTOR(S) | : Kumar N. Senthil et al. |

It is certified that error appears in the above-identified patent and that said Letters Patent is hereby corrected as shown below:

On the Title Page

Item (12), delete "Senthil" and insert --Senthil et al.--

Item (72), Please add as second Inventor Stella Rowlett, Redmond, WA (US)

Signed and Sealed this
Fifteenth Day of November, 2022

Katherine Kelly Vidal
*Director of the United States Patent and Trademark Office*